United States Patent
Story et al.

[11] Patent Number: 5,971,693
[45] Date of Patent: Oct. 26, 1999

[54] HANDTRUCK WITH UNLOADING ASSEMBLY

[76] Inventors: Joseph L. Story, 280 Old Wood La., Salisbury, N.C. 28144-9023; Jerry B. Klock, Sr., 4430 Cauble Rd., Salisbury, N.C. 28144-1530

[21] Appl. No.: 08/883,247

[22] Filed: Jun. 26, 1997

Related U.S. Application Data

[60] Provisional application No. 60/020,880, Jun. 28, 1996.

[51] Int. Cl.⁶ .................................................. B62B 1/10
[52] U.S. Cl. ............................................................ 414/490
[58] Field of Search .......................... 414/490; 280/47.27

[56] References Cited

U.S. PATENT DOCUMENTS

| | | | |
|---|---|---|---|
| 1,542,023 | 6/1925 | Alexander | 414/490 |
| 1,710,893 | 4/1929 | Phillips | 414/490 |
| 2,452,258 | 10/1948 | Nielsen | 414/490 |
| 2,838,193 | 6/1958 | Statton | 414/490 |
| 3,403,800 | 10/1968 | Botello | 414/490 |
| 3,844,431 | 10/1974 | Crawford | 414/490 |
| 3,878,958 | 4/1975 | Ring | 414/490 |
| 5,256,025 | 10/1993 | Williamson | 414/490 |
| 5,256,028 | 10/1993 | Winski et al. | 414/796.8 X |
| 5,290,051 | 3/1994 | Olson | 414/490 X |
| 5,624,224 | 4/1997 | Brandenburg | 414/490 |

FOREIGN PATENT DOCUMENTS

| | | | |
|---|---|---|---|
| 2742101 | 3/1979 | Germany | 414/490 |
| 344952 | 4/1960 | Switzerland | 414/490 |

*Primary Examiner*—David A. Bucci
*Attorney, Agent, or Firm*—Gifford, Krass, Groh, Sprinkle, Anderson & Citkowski, P.C.

[57] ABSTRACT

The present invention is an extension assembly for use in combination with a handtruck which includes a load plate having a load carrying surface, a side rail assembly extending upwardly from and in mechanical communication with the load plate, and a pair of wheels in mechanical communication with the side rail assembly. The unload assist mechanism includes a push plate positioned above the load plate, the push plate having a load engaging surface extending substantially perpendicular to the load carrying surface. An extension assembly in mechanical communication with the handtruck and push plate, moves the push plate between a loading position and an unloading position while maintaining the perpendicular orientation of the load engaging surface with respect to the load carrying surface.

13 Claims, 4 Drawing Sheets

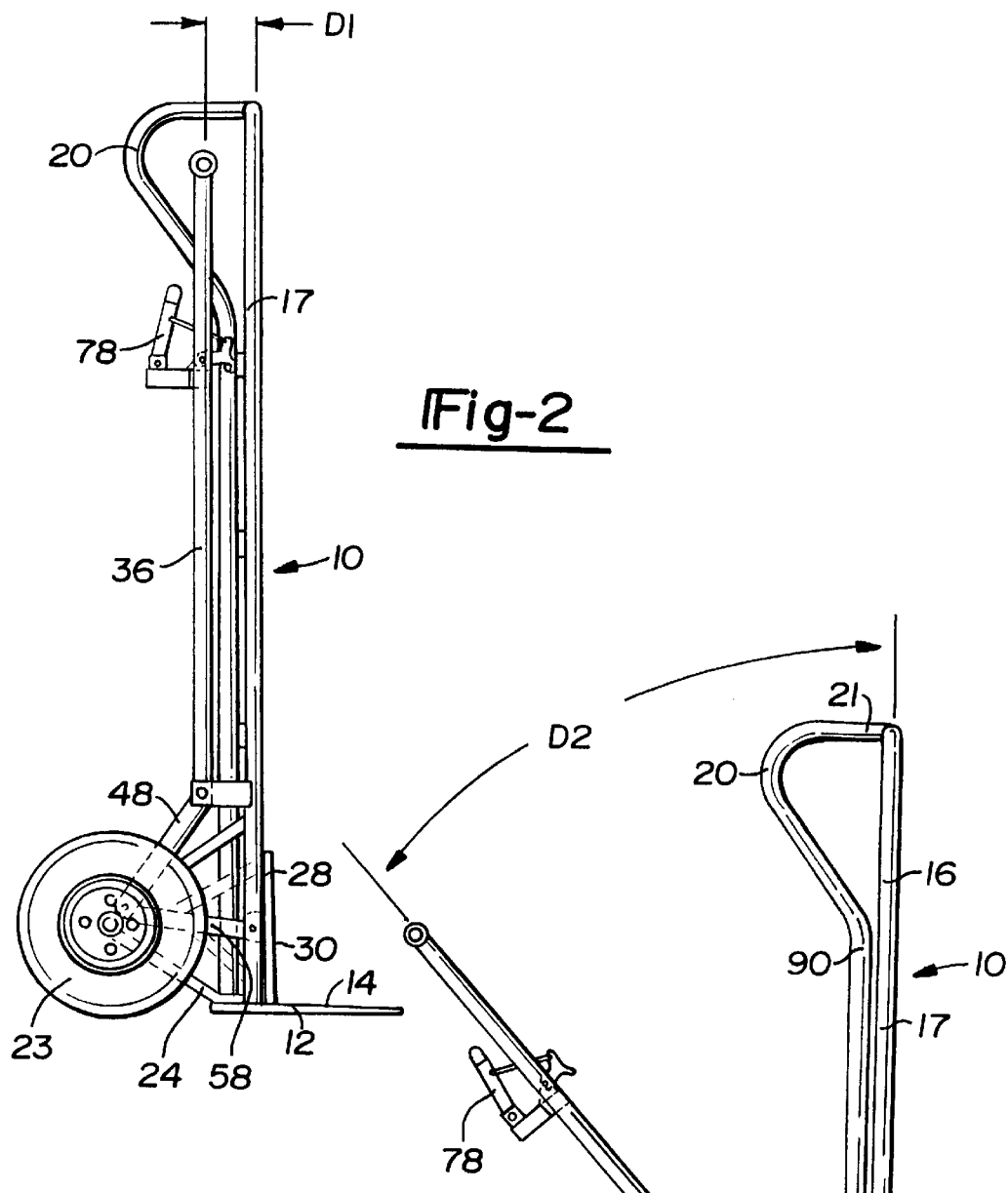

HANDTRUCK WITH UNLOADING ASSEMBLY

This application claims the benefit of U.S. Provisional Application No. 60/020,880, filed Jun. 28, 1996.

FIELD OF THE INVENTION

The present invention relates generally to handtrucks, and more particularly to handtrucks having mechanisms which assist the removal of a load positioned on the handtruck.

BACKGROUND OF THE INVENTION

Two-wheeled handtrucks are commonly utilized for moving loads which are too heavy or bulky to be moved by a single person. Handtrucks typically include a horizontal load plate, a pair of side rails extending vertically upward from the load plate, and a pair of wheels. An operator places a load on the load plate and pivots the handtruck so that it rests only on its wheels, the load plate is not in contact with the ground. With the handtruck in this position, a heavy load may be easily moved. To unload the handtruck an, operator will pull or twist the handtruck from under the load while tipping the load slightly forward. In most applications, an operator will repeatedly load and unload a handtruck to accomplish a series of tasks, such as making deliveries or moving industrial supplies. To reduce the potential for injury to the operator and damages to the load from falling forward off the handtruck, many prior art handtrucks are equipped with various mechanisms which assist removal of the load from the handtruck.

Many prior art devices push the load off the handtruck using a bar or plate which is suspended from a point above the load and pivoted outwardly against the load to remove the load from the handtruck. In particular, U.S. Pat. No. 3,878,958 to Ring discloses a two-wheeled handtruck with a back plate which is swingably supported from a point near the upper ends of the truck handles. A handle acts on a linkage attached to the backplate to move the back plate arcuately forward, thus pushing the load off the front of the handtruck. The Ring device results in force being applied to the load in an arcuately upward fashion, tending to tip the load forward. Additionally, the friction between the plate and load as the plate moves arcuately upward against the load also tends to tip the load forward, resulting in damage to the load.

U.S. Pat. No. 3,844,431 to Crawford discloses an unloader mechanism for a handtruck which attempts to improve upon the prior art by avoiding the arcuate motion of other load removal mechanisms. Unfortunately, the Crawford mechanism is designed solely for foot operation by a user. This method of operation requires the user to be off-balance while attempting to unload the handtruck. To reduce the potential for injury or accident, the operator of any such handtruck should be standing securely with the operator's weight balanced on both feet.

U.S. Pat. No. 5,290,051 to Olson also discloses an unloading mechanism for two-wheeled handtrucks. In the Olson device, an operator grasps a handle and moves the handle slidably and pivotably downward. The handle is mechanically linked to a push-off shoe which pushes the load off the handtruck. While the Olson device avoids most of the arcuate motion of prior art devices, the operator must slide the handle downwardly through a sliding track while also pivoting the handle, a motion which is more difficult for the operator to perform than a simple pivoting motion. The Olson device also requires additional sliding elements which unnecessarily complicate the unloading mechanism. Thus, there remains a need for a simple, hand operable unloading mechanism for a two-wheeled handtruck having simple, uncomplicated linkages which enable a load to be moved substantially horizontally off a handtruck.

SUMMARY OF THE INVENTION

The present invention is an unloading mechanism for attachment to a handtruck, the unloading mechanism comprising an extension assembly and a push plate. The handtruck may be of any conventional configuration, and typically comprises a load plate having a load carrying surface, a side rail assembly and a pair of wheels. The side rail assembly, extending upwardly from and in mechanical communication with the load plate, includes, in the preferred embodiment, a pair of elongated, spaced side rails extending parallel to each other which form handles at their upper ends. A pair of wheels are in mechanical communication with the side rail assembly, enabling the handtruck to be tilted backward, the load resting on the side rail assembly, thus permitting the handtruck to be rolled to a new location. The unloading mechanism includes a push plate positioned on the load plate. In alternate embodiments, the push plate may slidably engage the load plate and/or load carrying surface.

The push plate has a load engaging surface facing away from the side rail assembly which extends perpendicularly to the load carrying surface of the load plate. An extension assembly, in mechanical communication with the side rail assembly, is pivotably mounted to the push plate. The extension assembly is configured to move the push plate between a loading position wherein the push plate is positioned proximate to the side rail assembly, and an unloading position wherein the push plate is moved forward across the load carrying surface while maintaining the perpendicular orientation of the load engaging surface with respect to the load carrying surface.

In the preferred embodiment, the extension assembly comprises a handle assembly having an upper end and a lower end, the lower end of the handle assembly being pivotably mounted to the side rail assembly, the handle assembly being movable between a storage position wherein the upper end of the handle is spaced from the side rail assembly by a distance D1 and an unload position wherein the upper end of the handle is spaced apart from the side rail assembly by a distance D2 which is greater than D1. In the preferred embodiment, the length of the handle is configured to be easily grasped and pivoted by an operator. In the preferred embodiment, the handle assembly comprises a U-shaped rail and a support rail, the U-shaped rail and support rail having lower ends mounted to the load plate. The upper end of the support rail is mounted to the central portion of the U-shaped rail. In such an embodiment, an axle extends between the parallel members of the U-shaped rail.

A first linkage, having an upper end and a lower end, is movable between an extended position and a retracted position. The upper end of the first linkage is attached to the lower end of the handle assembly so that, when the handle assembly is in its storage position, the first linkage is in its retracted position. When the first linkage is in its extended position, the handle assembly is in its unload position. In the preferred embodiment, the first linkage comprises a pair of elongated, spaced apart first arms which extend parallel to each other. In such an embodiment, an axle extends between the first arms.

A second linkage has a rearward end and a forward end, the rearward end being pivotably attached to the lower end of the first linkage. The forward end of the second linkage is pivotably attached to the push plate. In the preferred embodiment, the second linkage comprises a pair of elongated, spaced apart second arms which extend parallel to each other. In such an embodiment, an axle extends between the second arms. Thus, when the handle assembly is moved from its storage position to its unload position, the first linkage is moved from its retracted position to its extended position, urging the second linkage forward and moving the push plate from its loading position to its unloading position. The extension assembly moves the push plate from its loading position to its unloading position while maintaining the perpendicular orientation of the load engaging surface relative to the load carrying surface.

In the preferred embodiment, at least one strut is in mechanical communication with the second linkage and extends outwardly and forwardly towards the push plate. Preferably, at least two struts are utilized and extend toward the push plate to assist in maintaining the perpendicular orientation of the load engaging surface with respect to the load carrying surface.

The side rail assembly preferably further includes a plurality of ribs, each rib extending between the side rails. In the preferred embodiment, a handle locking mechanism is mounted to the side rail assembly and is configured to releasably lock the handle into its storage position.

Other objects, advantages and applications of the present invention will be made clear by the following detailed description of a preferred embodiment of the invention. The description makes reference to drawings in which:

BRIEF DESCRIPTION OF THE DRAWINGS

FIG. 2 is a partial cross-sectional side view of the invention, the handle assembly being in its storage position;

FIG. 3 is a partial cross-sectional side view of the present invention, the handle assembly being in its unload position;

DETAILED DESCRIPTION

The present invention solves the problem of prior art unloading mechanisms configured for attachment to handtrucks by providing an unloading mechanism which enables an operator to stand squarely on both feet and, by using a simple, pivoting arm motion, rotate a handle assembly downwardly, thus moving a push plate having a load engaging surface horizontally against a load positioned on a load carrying surface, the load engaging surface being disposed perpendicularly to the load carrying surface.

Figure 1:
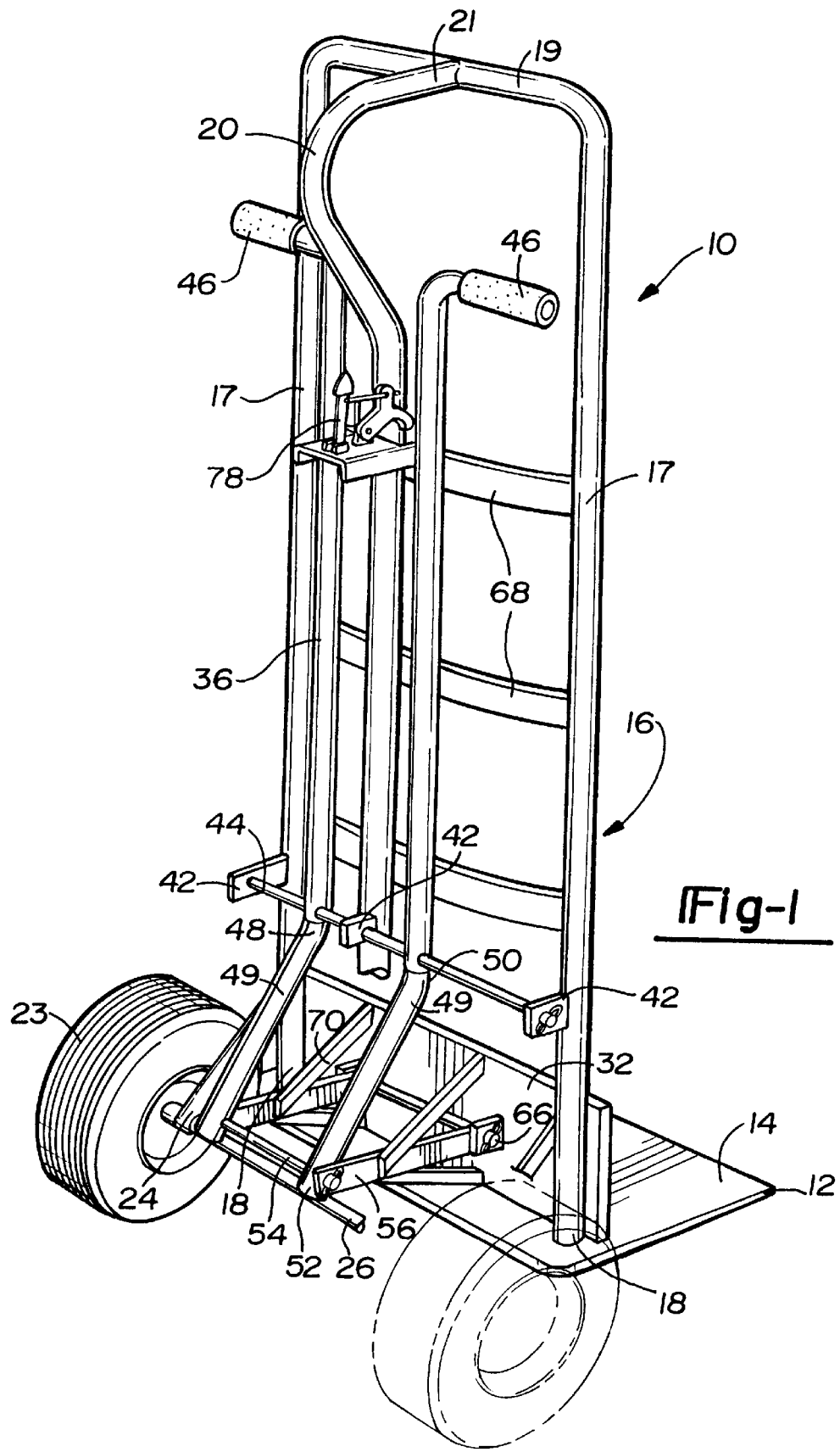
FIG. 1 is a perspective view of the present invention.

Referring now to FIG. 1, a handtruck 10 is shown having a load plate 12 which is attached to a side rail assembly 16 extending upwardly from the load plate. In the preferred embodiment, side rail assembly 16 includes a U-shaped rail 17 having two lower ends 18 and a central portion 19. Side rail assembly 16 also includes a support rail 20 having an upper end 21 and a lower end 22. In the preferred embodiment and as shown in FIG. 1, the support rail 20 is configured to be easily grasped by an operator proximate to its upper end 21. The lower ends 18 of U-shaped rail 17 are mounted to load plate 14 by welding, bolting or the like. Lower end 22 of support rail 20 is also mounted to load plate 14, upper end 21 of support rail 20 also being mounted to central portion 19 of the U-shaped rail 17 by welding, bolting or the like. Side rail assembly 16 may be variously configured, including an embodiment wherein two spaced apart, elongated side rails extending parallel to each other extend upwardly from load plate 12. Preferably, the side rail assembly 16 further includes a plurality of ribs 68, each rib 68 disposed between the elongated portions of the U-shaped side rail 17.

Load plate 12 includes a load carrying surface 14 which is disposed forwardly of the lower ends 18 of U-shaped side rail 17. Handtruck 10 further includes a pair of wheels 23 mounted to the U-shaped side rail 17 via wheel mounting brackets 24.

As seen in FIG. 14, a push plate 28 is positioned on the load plate 12, the push plate 28 having a load engaging surface 30 disposed at its forward end. In alternate embodiments, the push plate 28 may be spaced apart from the load carrying surface 14, thus reducing the force required to move push plate 28 forward. The load plate 12 may alternately slidably engage the load carrying surface 14 via a sliding track engaging the push plate 28.

Push plate 28 and load plate 12 are positioned so that the load engaging surface 30 is perpendicular to the load carrying surface 14. By maintaining the perpendicular relationship between the load carrying surface 14 and load engaging surface 30, a load may be pushed off load plate 12 without creating any forces which would tend to tip the load forward off the handtruck 10 and thereby damaging the load.

Figure 4:
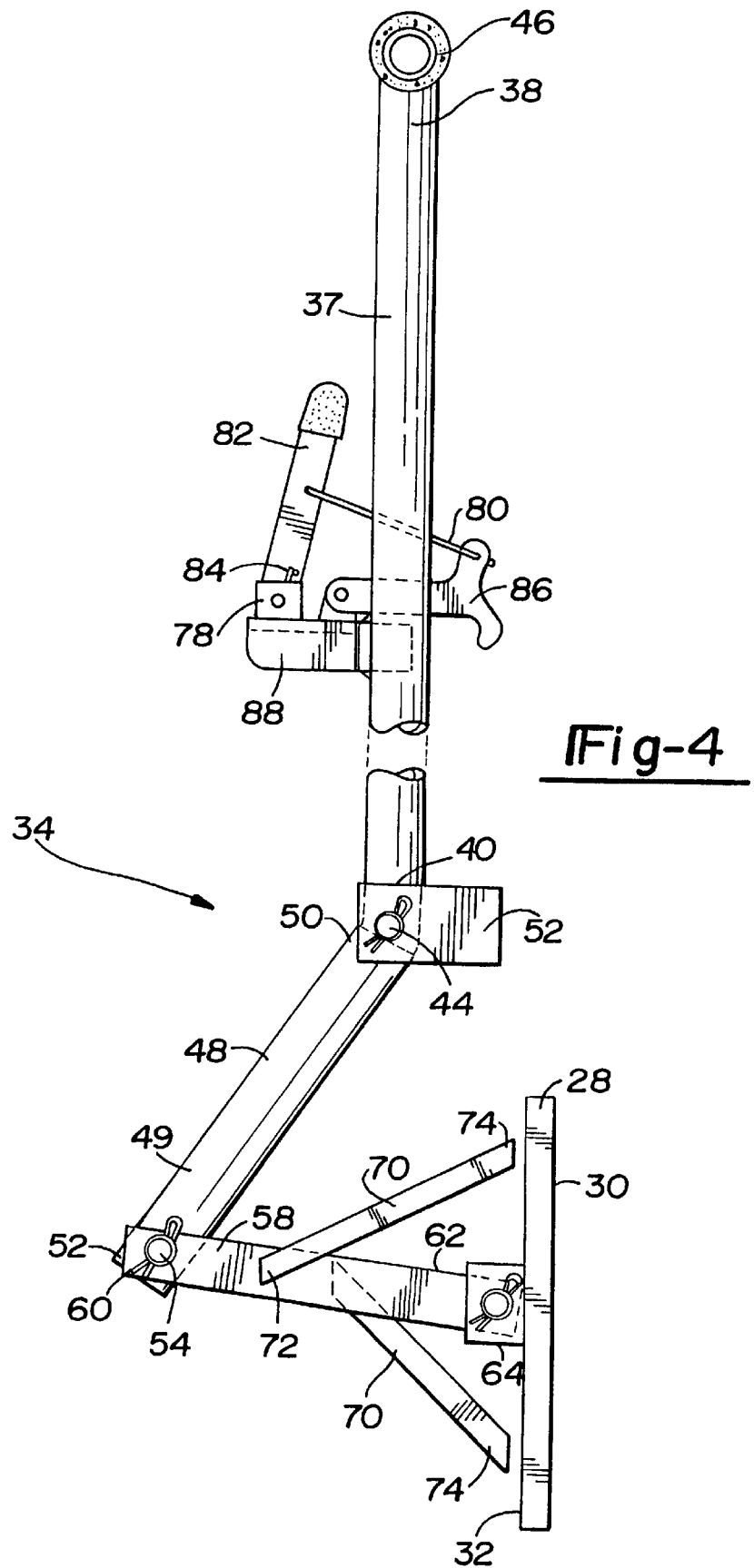
FIG. 4 is a view of the extension mechanism and push plate.
Figure 5:
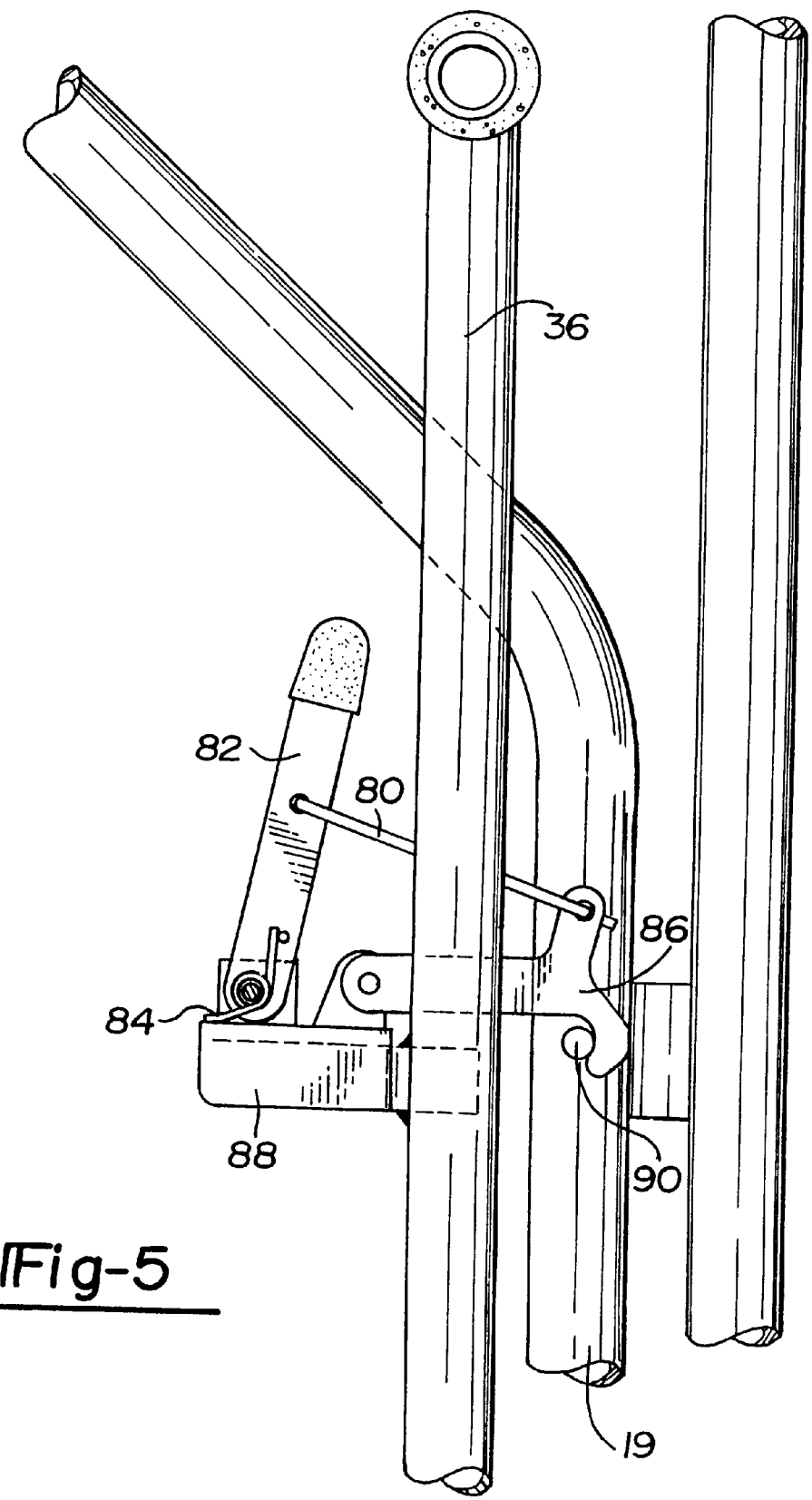
FIG. 5 is a view of the handle locking mechanism.

As best seen in FIG. 4, an extension assembly 34 is pivotably mounted to push plate 28. Extension assembly 34 includes a handle assembly 36 which preferably includes a pair of elongated, tubular members 37 which are joined at their lower end by an axle 44. Each tubular member 37 has a lower end 40 and an upper end 38 which correspond to the upper and lower ends of handle assembly 36. Axle 44 preferably passes through apertures in the lower ends 40 of tubular members 37 and is secured thereto by a cotter pin or the like. Lower ends 40 of the members 37 are pivotably mounted to side rail assembly 16, and preferably are mounted to either the U-shaped side rail 17 or the support rail 20 by a bracket 42.

The handle assembly 36 is moveable between a storage position and an unloading position. Handle assembly 36 is depicted in its storage position in FIG. 2 wherein the upper end of handle assembly 36 is spaced from the U-shaped side rail 17 by a distance D1. FIG. 3 depicts handle assembly 36 in its unloading position, wherein the upper end of handle assembly 36 is spaced from the U-shaped side rail 17 by a distance D2 which is greater than D1. In the preferred embodiment, a pair of handgrips 46 are positioned at the upper end 38 of the handle assembly 36, enabling an operator to easily grasp and pivot the handle assembly.

A first linkage 48 extends downwardly from handle assembly 36 and preferably includes a system of connecting bars or links, although first linkage 48 may be comprised of a single such bar or link. In the preferred embodiment, the first linkage 48 includes a pair of spaced apart first arms 49, each first arm having an upper end 50 and a lower end 52, the upper and lower ends of the first arms corresponding to the upper and lower ends of the first linkage 48. An axle 54 is disposed between the first arms 49 and is preferably positioned between their lower ends 52. The upper ends 50 of the first arms 49 are attached to the lower ends 40 of members 37. Handle assembly 36 is fixedly mounted to first linkage 48 so that, as handle assembly 36 is rotated downwardly, the lower ends 52 of first arms 49 are rotated forwardly. In an alternate embodiment, a member 37 and a first arm 49 may be formed as a single, elongated link.

A second linkage 56 is pivotably mounted to the first linkage 48 and the rearward surface 32 of push plate 28, second linkage 56 preferably including a pair of elongated second arms 58. Each second arm 58 includes a forward end 62 and a rearward end 60, the forward and rearward ends of the second arms 58 corresponding to the forward and rearward ends of second linkage 56. The lower end 52 of each first arm 49 is rotatably mounted, via axle 54 or the like, to the rearward end 60 of each second arm 58. The forward end 62 of each second arm 58 is pivotably mounted, via bracket 64 and axle 66, to the rearward surface 32 of push plate 28. In alternate embodiments of the present invention, the aforementioned structures may be pivotably connected in a variety of ways.

As shown in FIGS. 1–4, at least one strut 70 is mounted to a second arm 58, the forward end 74 of strut 70 extending towards push plate 28. The rearward end 72 of strut 70 may be mounted anywhere along one of the second arms 58. The forward end 74 of strut 70 is angled or otherwise configured so that, as push plate 28 pivots about axle 66, the strut 70 prevents push plate 28 from pivoting too far from its perpendicular position, thus permitting some flexibility in the position of push plate 28 with respect to the load without substantial deviations from its perpendicular position. Thus, push plate 28 has sufficient flexibility to accommodate load shifts or undesired movement of the extension assembly while maintaining the perpendicular orientation between load engaging surface 30 and load carrying surface 14.

In the preferred embodiment of the present invention, a handle locking mechanism 78 is provided which enables the handle assembly 36 to be locked into its storage position. In the preferred embodiment, the handle locking mechanism 78 includes a lever 82, pivotably mounted to the rearward portion of a supporting member 88, which is mounted to the handle assembly 36. A latch member 86 is pivotably mounted to the supporting member 88 proximate to its forward end. Latch member 86, connected to lever 82 via bar 80, is configured to engage a rod 90 which may be mounted on the support rail 20 or ribs 68 of the side rail assembly 16. Spring 84 urges latch member 86 forwardly into engagement with rod 90. To unlock the handle assembly 36, the operator pivots lever 82 rearwardly, causing latch member 86 to disengage rod 90. In alternate embodiments, any of a wide variety of handle locking mechanisms may be utilized to lock handle assembly 36 into its storage position.

To unload a load from handtruck 10, an operator unlatches the handle locking mechanism 78 and pivots the handle assembly 36 downwardly from its storage position. As the handle assembly 36 is moved from its storage position to its unload position, the first linkage 48 is moved from its retracted position to its extended position, thereby moving the push plate 28 from its loading position wherein it is positioned proximate to the lower ends of side rail 17, to its unloading position wherein the push plate 28 is spaced apart from the lower ends of side rail 17. Push plate 28 is moved from its loading to its unloading position while maintaining the substantially perpendicular orientation of the load engaging surface 30 relative to the load carrying surface 14. This simple, rotational movement of the arms avoids unnecessary twisting of the operator's back and torso and enables the operator to unload the load from handtruck 12 with the operator's weight evenly distributed on both feet and with a minimum of effort.

Having described the various embodiments of the present invention with reference to the accompanying figures, it will be appreciated that various changes and modifications can be made without departing from the scope or spirit of the invention.

We claim:

1. A handtruck comprising:

a load plate having a load carrying surface;

a side rail assembly extending upwardly from and in mechanical communication with the load plate;

a pair of wheels in mechanical communication with the side rail assembly;

a push plate having a load engaging surface, the load engaging surface extending substantially perpendicular to the load carrying surface; and an extension assembly in mechanical communication with the side rail assembly, the extension assembly pivotably mounted to the push plate, the extension assembly configured to move the push plate between a loading position and an unloading position while maintaining the substantially perpendicular orientation of the load engaging surface with respect to the load carrying surface, the extension assembly comprising a handle assembly having an upper end and a lower end, the lower end of the handle assembly being pivotably mounted to the side rail assembly so that the handle assembly is moveable between a storage position wherein the upper end of the handle assembly is spaced apart from the side rail assembly by a distance D1 and an unload position wherein the upper end of the handle assembly is spaced apart from the side rail assembly by a distance D2 which is greater than D1;

a first linkage having an upper end and a lower end, the upper end of the first linkage attached to the lower end of the handle assembly so that, when the handle assembly is in its storage position, the lower end of the first linkage is in a retracted position, the lower end of the first linkage being in an extended position when the handle is in its unload position;

a second linkage having a rearward end and a forward end, the rearward end of the second linkage being pivotably attached to the lower end of the first linkage, the forward end of the second linkage being pivotably attached to the push plate, so that, when the handle assembly is moved from the storage position to the unload position, the first linkage is moved from its retracted position to its extended position, thereby moving the push plate from its loading position to its unloading position while maintaining the substantially normal orientation of the load engaging surface relative to the load supporting surface; and at least one strut in mechanical communication with the second linkage, the strut extending towards the push plate.

2. The handtruck of claim 1 wherein the side rail assembly comprises a U-shaped rail having two lower ends and a central portion, the lower ends mounted to the load plate and a support rail having an upper end mounted to the central portion of the U-shaped rail.

3. The handtruck of claim 1 further including a handle locking mechanism mounted to the side rail assembly, the handle locking mechanism configured to releasably lock the handle assembly into its storage position.

4. The handtruck of claim 1 wherein the handle assembly comprises a pair of elongated, spaced apart members extending substantially parallel to each other, and an axle extending therebetween.

5. The handtruck of claim 1 wherein the first linkage comprises a pair of elongated, spaced apart first arms extending substantially parallel to each other, and a first axle extending therebetween.

6. The handtruck of claim 1 wherein the second linkage comprises a pair of elongated, spaced apart second arms extending substantially parallel to each other, and a second axle extending therebetween.

7. The handtruck of claim 1 wherein the side rail assembly comprises a U-shaped rail having two lower ends and a central portion, the lower ends mounted to the load plate and a support rail having an upper end mounted to the central portion of the U-shaped rail.

8. In a handtruck comprising a load plate having a load carrying surface, a side rail assembly extending upwardly from and in mechanical communication with the load plate, and a pair of wheels in mechanical communication with the side rail assembly, the improvement comprising:

a push plate having a load engaging surface, the load engaging surface extending substantially perpendicular to the load carrying surface; and an extension assembly in mechanical communication with the side rail assembly, the extension assembly pivotably mounted to and the push plate, the extension assembly configured to move the push plate between a loading position and an unloading position while maintaining the substantially perpendicular orientation of the load engaging surface with respect to the load carrying surface, the extension assembly comprising:

a handle assembly having an upper end and a lower end, the lower end of the handle assembly being pivotably mounted to the side rail assembly so that the handle assembly is moveable between a storage position wherein the upper end of the handle assembly is spaced apart from the side rail assembly by a distance D1 and an unload position wherein the upper end of the handle assembly is spaced apart from the side rail assembly by a distance D2 which is greater than D1;

a first linkage having an upper end and a lower end, the upper end of the first linkage attached to the lower end of the handle assembly so that, when the handle assembly is in its storage position, the lower end of the first assembly is in a retracted position, the lower end of the first linkage being in an extended position when the handle assembly is in its unload position;

a second linkage having a rearward end and a forward end, the rearward end of the second linkage being pivotably attached to the lower end of the first linkage, the forward end of the second linkage being pivotably attached to the push plate, so that, when the handle assembly is moved from the storage position to the unload position, the first linkage is moved from its retracted position to its extended position, thereby moving the push plate from its loading position to its unloading position while maintaining the substantially normal orientation of the load engaging surface relative to than load carrying surface;

at least one strut attached to the second linkage, the strut extending towards the push plate.

9. The handtruck of claim 8 wherein the handle assembly comprises a pair of elongated, spaced apart members extending substantially parallel to each other, and an axle extending therebetween.

10. The handtruck of claim 8 wherein the first linkage comprises a pair of elongated, spaced apart first arms extending substantially parallel to each other, and a first axle extending therebetween.

11. The handtruck of claim 8 wherein the second linkage comprises a pair of elongated, spaced apart second arms extending substantially parallel to each other, and a second axle extending therebetween.

12. The handtruck of claim 8 wherein the side rail assembly comprises a U-shaped rail having two lower ends and a central portion, the lower ends mounted to the load plate and a support rail having an upper end mounted to the central portion of the U-shaped rail.

13. An unload assist mechanism for attachment to a handtruck including a load plate having a load carrying surface, a side rail assembly extending upwardly from and in mechanical communication with the load plate, and a pair of wheels in mechanical communication with the side rail assembly, the unload assist mechanism comprising:

a push plate having a load engaging surface, the load engaging surface extending substantially perpendicular to the load carrying surface; and an extension assembly in mechanical communication with the side rail assembly, the extension assembly pivotably mounted to the push plate, the extension assembly configured to move the push plate between a loading position and an unloading position while maintaining the substantially perpendicular orientation of the load engaging surface with respect to the load carrying surface;

a handle assembly having an upper end and a lower end, the lower end of the handle assembly being pivotably mounted to the side rail assembly so that the handle assembly is moveable between a storage position wherein the upper end of the handle assembly is spaced apart from the side rail assembly by a distance D1 and an unload position wherein the upper end of the handle assembly is spaced apart from the side rail assembly by a distance D2 which is greater than D1;

a first linkage having an upper end and a lower end, the upper end of the first linkage attached to the lower end of the handle assembly so that, when the handle assembly is in its storage position, the lower end of the first linkage is in a retracted position, the lower end of the first linkage being in an extended position when the handle assembly is in its unload position;

a second linkage having a rearward end and a forward end, the rearward end of the second linkage being pivotably attached to the lower end of the first linkage, the forward end of the second linkage being pivotably attached to the push plate, so that, when the handle assembly is moved from the storage position to the unload position, the first linkage is moved from its retracted position to its extended position, thereby moving the push plate from its loading position to its unloading position while maintaining the substantially normal orientation of the load engaging surface relative to the load supporting surface; and at least one strut in mechanical communication with one of the second arms, each strut extending towards the push plate.

\* \* \* \* \*